United States Patent [19]
Tavislan et al.

[11] Patent Number: 5,422,472
[45] Date of Patent: Jun. 6, 1995

[54] OPTICAL SYMBOL (BAR CODE) READING SYSTEMS HAVING AN ELECTRO-OPTIC RECEPTOR WITH EMBEDDED GRATING RINGS

[75] Inventors: James M. Tavislan; Jay M. Eastman, both of Pittsford; Anna M. Quinn, Rochester, all of N.Y.

[73] Assignee: PSC, Inc., Webster, N.Y.

[21] Appl. No.: 138,313

[22] Filed: Oct. 18, 1993

Related U.S. Application Data

[63] Continuation-in-part of Ser. No. 985,371, Dec. 4, 1992.

[51] Int. Cl.$^6$ ............................................. G06K 7/10
[52] U.S. Cl. .................................... 235/472; 235/462; 235/473; 250/216; 385/14
[58] Field of Search ............... 235/472, 462, 473, 457; 359/572, 574; 250/216; 385/14

[56] References Cited

U.S. PATENT DOCUMENTS

| | | | |
|---|---|---|---|
| 3,763,372 | 10/1973 | Fedotowsky | 250/211 |
| 5,015,831 | 5/1991 | Eastman . | |
| 5,115,120 | 5/1992 | Eastman . | |
| 5,144,120 | 9/1992 | Krichever | 235/472 |
| 5,200,597 | 4/1993 | Eastman . | |
| 5,208,449 | 5/1993 | Eastman . | |
| 5,212,372 | 5/1993 | Quick . | |
| 5,237,161 | 8/1993 | Grodevant . | |
| 5,268,985 | 12/1993 | Ando | 385/129 |

Primary Examiner—Donald Hajec
Assistant Examiner—Karl D. Frech
Attorney, Agent, or Firm—M. Lukacher

[57] ABSTRACT

A miniature scan engine module for bar code reading and data collection systems utilizes a light source and a light collector flexurally supported on a platform which reciprocates on pivots defined by flexures. The light received from the code, as it is scanned, is collected along an optical collector having a surface area approximately equal to the surface area of one side of the scan engine. The optical collector in which the gratings are embedded faces the bar code and pivots with the scanning beam source (a laser diode). A pair of diffraction gratings in a surface of the optical collector which faces away from the code directs the incoming light so that it propagates internally in a substrate within the body of the collector, i.e. in the optic itself to photodetectors via reflective and light concentrating surfaces over the photodetector. Efficient light collection capability, without the need for special optics such as lenses and collection mirrors, enables the scan engine to be configured so that it occupies a miniature volume. A data collection system, in the form of a portable terminal, has a housing which provides the handle for a scanning accessory which is the scan engine module.

34 Claims, 5 Drawing Sheets

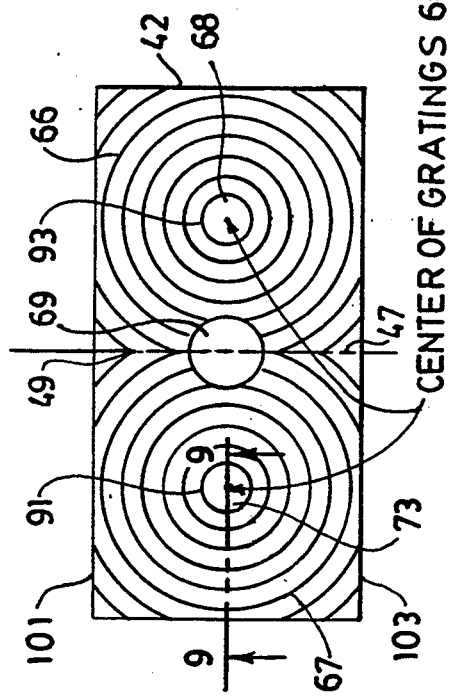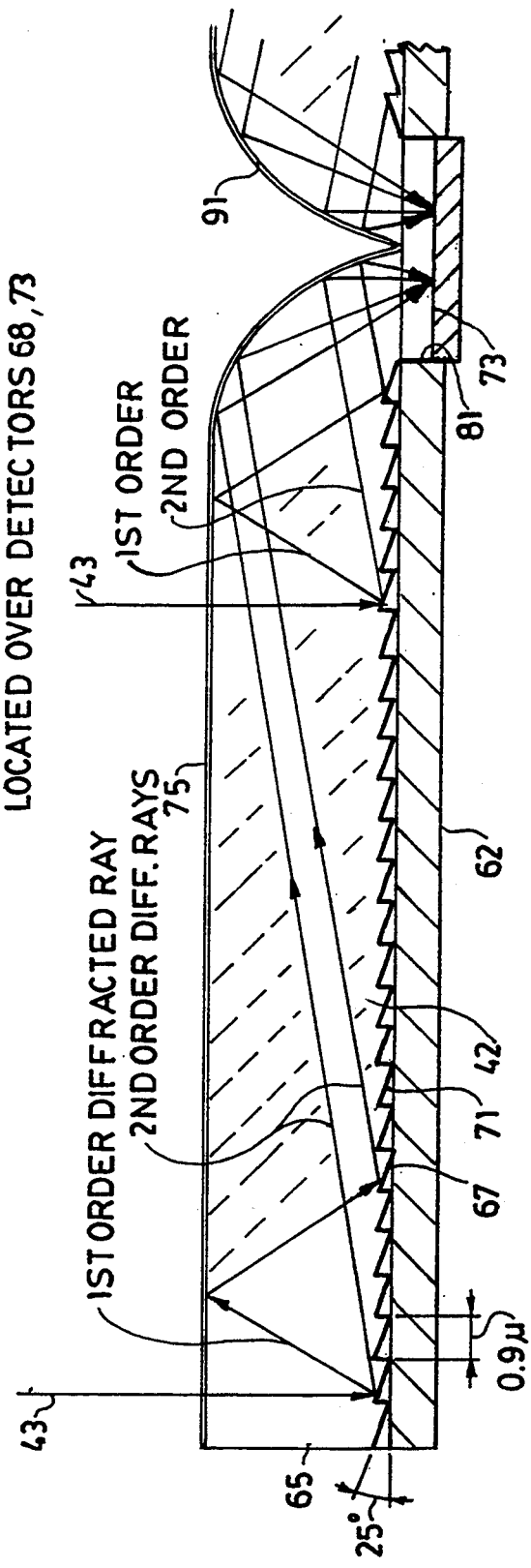

OPTICAL SYMBOL (BAR CODE) READING SYSTEMS HAVING AN ELECTRO-OPTIC RECEPTOR WITH EMBEDDED GRATING RINGS

DESCRIPTION

This application is a continuation-in-Part of U.S. patent application Ser. No. 07/985,371 filed Dec. 4, 1992 in the names of J. M. Eastman and J. M. Zavislan.

The present invention relates to scan engines or modules for scanning a light beam across an optically readable data representing symbol, such as a bar code, and receiving light from the symbol upon illumination by the beam to provide signals representing the symbol and also to an improved optic for the collecting of the light received from the symbol which facilitates the miniaturization of such modules.

The invention also relates to data collection systems and especially to portable terminals (sometimes called portable transaction terminals) having a terminal unit and a scanning accessory in a handle, which contains the terminal unit and which contains a symbol reader operable independently or with the terminal unit for providing signals corresponding to the data represented by the symbol to the terminal unit for processing and/or storage therein.

The miniature scan engines or modules, such as provided in accordance with the invention, when integrated in a portable terminal, as in the limited space provided in a manually graspable handle, enables the integrated terminal to be reduced in size so as to make it easier to carry and operate, thereby providing an improved, portable data collection system capable of data entry manually and by bar code reading. A scan engine provided by the invention may occupy a volume of less than 1 & ½ cubic inch in a generally rectangular package. The received light collection optic provided by the invention is useful generally in collection of light in a field of view and especially where miniaturization or design simplification, for example, of scan engines, is desired. The term scan engine and module, as used herein, may be taken to mean a unitary assembly of a light beam source, a beam deflector and optical and electronic components for collection and translating light received from a symbol (e.g. a bar code) into data representing electrical signals.

As smaller light sources, particularly semi-conductor lasers, capable of developing high illumination intensity levels have become available, bar code scanning devices have been reduced in size. An avenue for size reduction has been in the manner in which the light source and associated photo detectors are mounted. U.S. Pat. 5,015,813 issued to Eastman et al., on May 14, 1991 and Eastman Patent 5,115,120 issued May 19, 1992, illustrate scan engines using flexural mounts. Such mounts facilitate miniaturization of a scan engine by enabling the laser diode and associated photodetector to be mounted on a support which can be reciprocally oscillated to scan the light beam across a bar code symbol.

Another factor which has limited miniaturization is the need to collect sufficient light from the code upon illumination thereof by the scanning beam to enable a photodetector to transduce the light into an electrical signal containing the data represented by the bar code. To meet these goals it has been proposed to use detectors or detector arrays of as wide an area as possible, collecting lenses for focusing the incoming illumination on the detector or to utilize collection mirrors. Air paths among and between lenses, mirrors and the detector, over which light must propagate, requires space and limits miniaturization. Further progress toward miniaturization has been limited, because the light collected by lens and/or mirror systems of scaled down size, becomes insufficient for reliable and accurate translation into data representing electrical signals. It is a feature of this invention to provide an improved light collection optic which removes such limitations thereby enabling still further miniaturization of scan engines or modules, and also to provide improved scan engines incorporating such light collection optics.

Data collection systems incorporating bar code scanners as a means for collecting data for processing or storage are widely used for inventory and stock management, as well as point of sales data collection. These systems, sometimes called data collection or transaction terminals, may be used by themselves to independently collect the data and even process it. Such independent terminals may be miniature in size, limited only by the size of the display which is desired and the area desired for the keys of the keypad or keyboard thereof; the computerized data storage and collection facilities and batteries requiring only limited space. Bar code readers may also be used by themselves and connected by cables or radio links to separate or remote terminals. Also, it is desirable at times to utilize a remote terminal or a cash register terminal, to which the bar code reader may be linked, or to combine the reader with the portable terminal. The size of the bar code reading device has been a limitation upon the overall size and volume of an integrated bar code reading and data collection assembly (i.e., the portable transaction terminal). A portable transaction terminal where the data collection unit acts as the handle when assembled with a scan engine unit is described in the above referenced U.S. Pat. No. 5,115,120.

It is a feature of the present invention to provide an improved bar code reading scanner module or scanning accessory, which may be integrated with a data collection or processing unit to provide a portable terminal. The use of a miniature bar code scan engine module in accordance with this invention facilitates the incorporation thereof into a data collection and processing unit which can be in a handle of a housing which also provides a receptacle for the scanner module, thus providing an improved miniature portable transaction terminal.

Accordingly, objects of the invention include any or all of the following:
 (a) to provide improved optics for collecting light from data representing optical symbols (bar codes) effectively and efficiently while minimizing the physical space (volume) required for the light collection function;
 (b) to provide improved devices for reading such optical symbols including scan engines and modules which incorporate such improved light collection optics and thereby may be miniaturized; and
 (c) to provide improved transaction terminals for data collection with optical symbol (bar code) reading capabilities, which can be miniaturized.

Briefly described, the invention provides a scanning accessory which may be used with (or separately from) a terminal unit to provide a portable data collection or transaction terminal system for collecting and entering data both manually and by optically reading data representing symbols. The terminal unit has a data entry device which may be a keyboard for manual data entry, a display and computerized data processing and storage components. A housing provides a handle which receives a miniature scan engine having means for projecting a light beam outwardly therefrom and through a window in the handle towards optically readable symbols. The scan engine module also contains an electro-optical receptor and a semi-conductor laser or other light source. The receptor, includes an optic which collects and concentrates the light at an opto-electric transducer (photodetector). The optic uses diffractive elements, preferably diffractive axicons having ring gratings at the center of which a reflective concentrator, such as an annular parabolic reflector, is disposed, which directs the diffracted light to the photodetector. Preferably a pair of diffractive elements each with a central concentrator and detector are used to reduce the distance over which the light travels in the optic, thereby facilitating miniaturization of the scan engine.

The receptor and associated components may be mounted on a flexurally supported plate together with drive means (preferably electromagnetic in operation) which drive the plate, the source and the receptor to execute oscillatory motion thereby scanning the beam across the symbol. The optic uses a transparent plate. In order to couple light into the plate and direct the light at such angles to provide propagation towards the photodetector, a coating on the forward face of the plate facing the symbol is used which is transmissive at small (less than 10° in air) incidence angles, at which most of the return light is incident on that face of the plate. The diffraction grating is formed in or adjacent to the opposite or rear face of the plate. The light is transmitted through the coating, diffracted by the grating rings and reflected by the coating to the concentrating parabolic reflector. After one or more diffractive and reflective deflections the concentrated light reaches the photodetector disposed centrally of the grating rings. The light is contained internally of the plate until it is directed to the central photoelectric detector which faces the concentrator. The area of the surface of the plate, which is exposed to the return light, may be equal to the area of the scan engine module (the plate being of length and width equal to the length and width of the scan engine). The scan engine may be much smaller than the smallest length or width dimension in its thickness. Accordingly, the scan engine may be miniaturized so as to occupy a volume less than 1 & ¼ cubic inch, for example with a width and length of less than 1.5×1.0 inch and a thickness less than 0.8 inch.

The scan engine module facilitates the disposition of the scanning function of the terminal in a detachable handle as described in the parent application referenced above, as well as facilitating design of other miniaturized bar code reading scanning devices which may be attached to the back of the hand of an operator, in his or her helmet, as in U.S. Pat. No. 5,212,372 issued May 18, 1993 to Quick et al and U.S. Pat. No. 5,228,449 issued May 4, 1993 to Eastman et al, or elsewhere where space is limited.

The foregoing and other features, objects and advantages of the invention as well as presently preferred embodiments thereof will become more apparent from a reading of the following description in connection with the accompany drawings which:

FIG. 8 is top view of an optical receptor of the scan engine module shown in FIGS. 1-6, which is the same as in FIG. 7 except that the laser diode is in the center rather than below the receiptor in the FIG. 7 embodiment; and FIG. 9 is a fragmentary sectional view of the receptor taken along the line 9—9 in FIG. 8.

Figure 1:
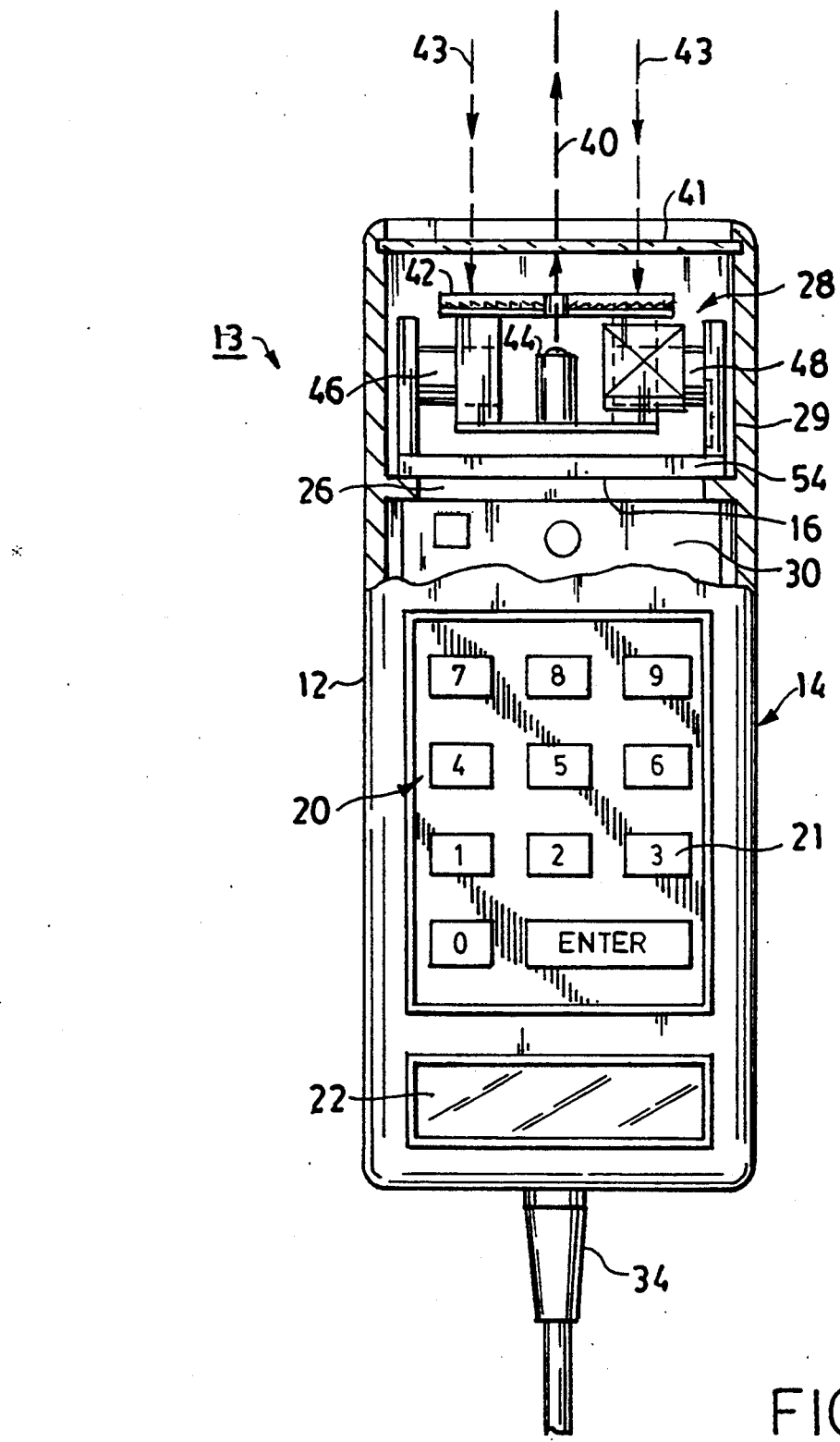
FIG. 1 is an elevational view, partially in section, of a portable terminal having bar code scanning accessory on an end of a handle having a manual data entry (keypad) and data processing unit, the terminal being shown as an integrated assembly.
Figure 2:
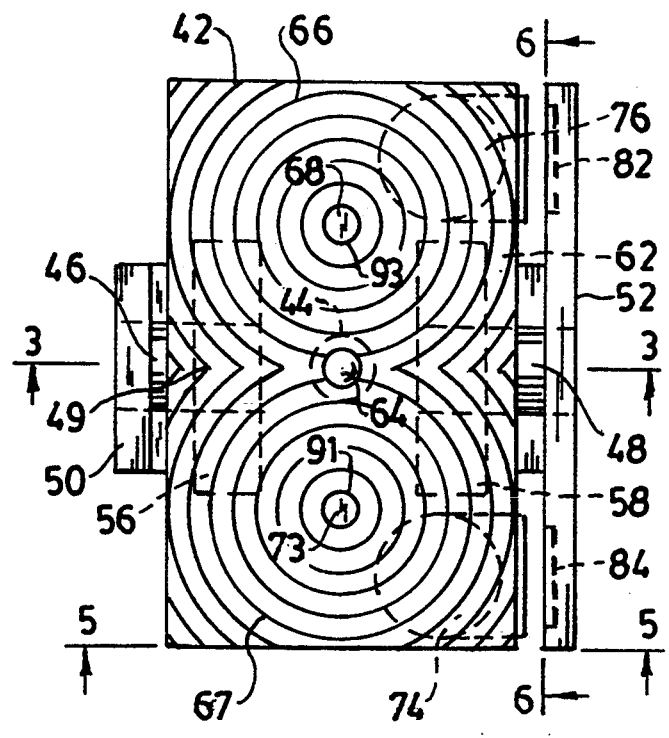
FIG. 2 is a plan view of the scan engine module shown in FIG. 1.

Referring to FIG. 1, there is shown a portable transaction terminal 14 having a housing 12 providing a handle, a bar code scanning reader, provided in principal part by a scan engine module (a scanning accessory) 13 and a data entry, processing and display terminal 20. The terminal has a keyboard 21 and a display 22 on one surface of the housing of the terminal which provides the handle 12. A bracket 26 has connector, which may be provided by techniques for molding interconnections wherein resins capable of being treated so as to accept conductive material by plating or electrodeposition, interconnects electrically the scanning accessory 13 to electronic circuits on a printer circuit board 30 in the terminal 14 which powers the scanning accessory and decodes and processes the bar code data read by the scanning accessory. Alternatively, the connections may be provided by optical links; e.g., optos such as light emitters (LEDS) and photodetectors on opposite sides of an interface 16 between a receptacle 29 in the housing 12, accommodating the scan engine module 28 which provides the scanning accessory of the terminal 14. A window 41 at the front end of the housing 12 covers the receptacle 29. A scan beam 40 is projected to the bar code through the window (a transmissive material plate) which also provides a port for the return light (represented by rays 43) from the code.

The scan engine 28 is attached by the connector on the bracket 26 and defines an integral miniaturized scan engine module. Below the bracket 26 is the circuit board 30 and a battery (not shown). The battery is optional, if power for operating the scan engine is from an external terminal, which is not shown, which is connected to the housing 12 by way of a cable 34. This cable has leads for signals which are obtained in response to light detected from bar codes which are scanned by the engine 28. Leads from the circuit board 30 (carrying signals from the processing unit of the terminal) also are connected to external equipment via the cable 34. These signal carrying leads to the terminal 14 and in the signal cable 34 may be connected in parallel. The handle 12 may have a trigger (not shown) which operates a switch connected to the circuit board for enabling power to be applied to a laser diode and to a drive mechanism of the scan engine which causes the light beam from the scan engine to scan across the code. Alternatively the reader may have means for automatically enabling the scan engine when an object on which a bar code is disposed is sensed, as for example described in U.S. Pat. No. 5,237,161 issued Aug. 17, 1993 and application Ser. No. 786,147 filed Oct. 31, 1991 in the name of Scott Grodevant and assigned to the same assignee as this application, now U.S. Pat. NO. 5,260,554 , issued Nov. 11, 1993 .

Figure 3:
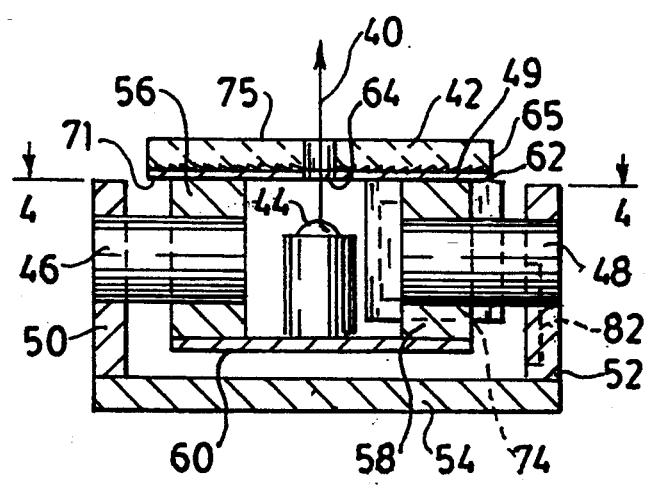
FIG. 3 is a sectional view taken along the line 3—3 in FIG. 2.
Figure 4:
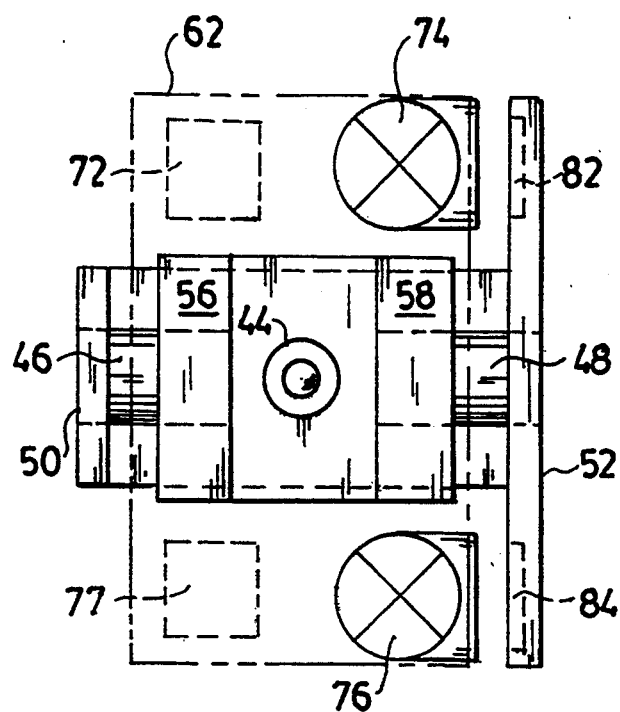
FIG. 4 is a view of the scan engine module with the optical receptor, its light collector and its support removed to show the components there below, the view being taken generally along the line 4—4 in FIG. 3.
Figure 5:
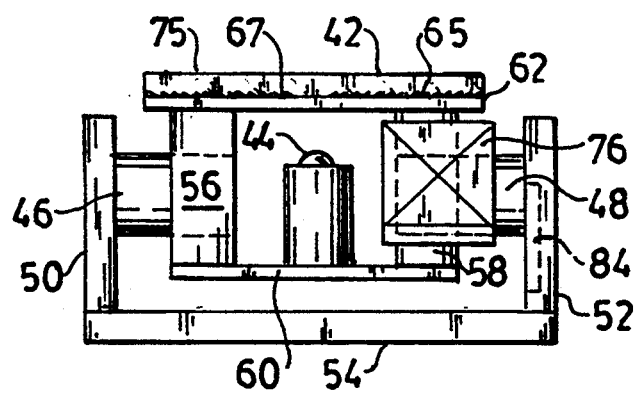
FIG. 5 is an end view taken along the line 5—5 in FIG. 2.
Figure 6:
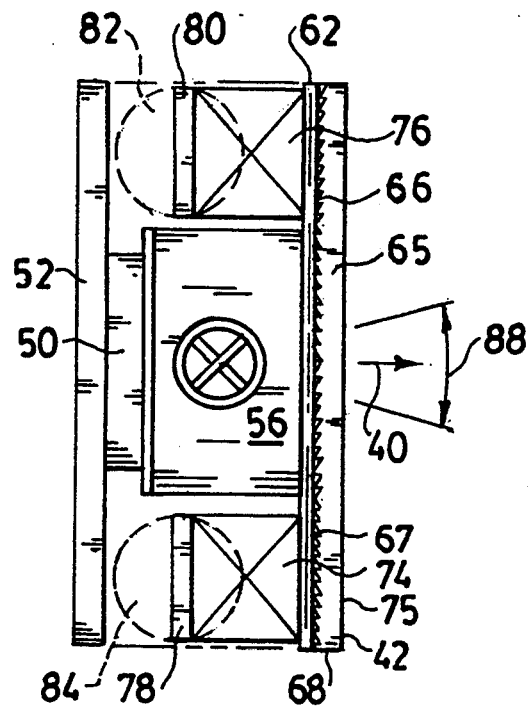
FIG. 6 is a side view taken along the line 6—6 in FIG. 2.

The scan beam 40 passes through the window or port 41 in the housing 12 in the direction of the code. Illumination from the code in response to this scanning beam is incident on an optical receptor or optic which includes a light collector 42 of the scan engine module 28. This collector and the semiconductor laser light source (laser diode 44) are mounted for conjoint oscillatory movement in flexures 46 and 48 which define a pivotal axis between foot members 50 and 52 extending from the base of a support 54 which is fixedly and stationarily mounted on the bracket 26. See also FIG. 3. The scan engine 28, thus, provides a laser light beam 40 which scans the code and translates the illumination received upon scanning from the code into signals representing the code which are then processed in circuitry on the circuit board 30 and forwarded to the display 22 or to another external terminal or other bar code signal utilization equipment which is connected to the handle by the cable 34. The circuitry on circuit board 30 may produce signals to initiate scanning by the scan engine module and to terminate scanning when a symbol is decoded or a period of time has elapsed. This circuitry may be of the type discussed in U.S. Pat. No. 5,200,597 issued Apr. 6, 1993 to Eastman et and U.S. Pat. No. 5,237,161 and application Ser. No. 07/786,147 referred to above.

The terminal 14 and the bar code scanner accessory 13 provides an integrated portable transaction terminal which the operator can hold in one hand by the handle and enter data with the other hand on the keyboard 21. This data is processed in the computerized data handling circuitry of the terminal 14. The data may be held in memory in the terminal 14 for later read out and/or displayed on the display 22. The terminal unit may also contain a transmitter and receiver to communicate data to and from a host computer via a wire or wireless link. Other facilities such as good read signals (audible or visual) may be provided. The handle unit may also be self-contained and the display 22 is operable to show visually the bar codes which are read or messages from the host computer.

The scan engine 28 which is shown in FIG. 1 and in greater detail in FIGS. 2 through 6 or FIG. 7 is of the type presently preferred for use in the portable transaction terminal 14. The light receptor/collector optic 42 is also shown in FIGS. 8 and 9.

In the scan engine illustrated in FIGS. 1–6, the flexures 46 and 48 may be of the type shown in the above-referenced U.S. Pat. No. 5,015,831. They include members which provide circuit paths or traces of conductive material carrying signals from the receptor 42 as well as lines to the laser diode 44 (plus 5 volts and ground) which apply power to the laser diode. These circuit path members may, when the flexures are plastic, be molded in strips of plated conductive material integral with the flexures.

A support for the laser diode 44 and the receptor 42 is provided by the support blocks 56 and 58. These support blocks are connected to the flexures 46 and 48 along one side thereof and also to lower and upper circuit boards 60 and 62. The lower circuit board 60, which may be a planar board, as illustrated, or a formed molded plated conductive material, carries the laser diode 44 and its control power and ground signals to circuit paths in the flexures either directly or via circuit board 62. These circuit paths may be in either or both of the flexures 46 and 48.

The upper circuit board 62 supports the optical collector (part of the electro-optical receptor 42). There may be an optical via, such as a hole 64, in the upper board 62 through which the beam 40 from the laser diode 44 projects on its way to the code (See FIG. 1). There may also be a hole in the optical collector in alignment with the hole 64.

Referring also to FIGS. 8 and 9 the collector 42, which is a transparent thin glass or plastic plate 65 having a pair of sets of grating rings 66 and 67 (or ring gratings). The plate provides the substrate for the gratings 66 and 67, as well as a light guide. Another type of optical via may be provided by a section 69 of the plate 65 where the grating lines are removed. This area is an area in alignment with the beam and through which the beam 40 passes. The plate 65 forms a light guide as seen in FIG. 9.

The gratings 66 and 67 may be blazed gratings or may be a transmission grating of the holographic type wherein the lines are internal, but preferably near the back or face 71 of the collector plate 65 (which faces away from the end of scan module which faces the code i.e. in a direction opposite to the direction of propagation of the scan beam 40). These ring gratings are sometimes called kineforms but are more descriptively called diffractive axicons.

At the center of each grating lens 66 and 67 are holes 81 containing photodetectors 68 and 73. Each photodetector may be a photodiode or phototransistor. The grating lines are essentially circles around the photodetectors 68 and 73. The forward face of the collector plate 65 has a coating 75 of thin film materials which provides an incidence angle dependent reflector; being transmissive to light at small incidence angles (about up to 10° measured in air) which is the incidence angle of most of the return light from the code, while being reflective of the light incident at greater angles (effectively as in a beam splitter) which constitutes the light diffracted at the ring gratings 66 and 67, as shown in FIG. 9, e.g. about 30° or greater incidence angles, measured in the plate 65.

Incident light is directed towards the center of each grating, thereby limiting distance the light has to travel within the substrate and limit the interactions with the grating. After the first interaction with the grating, a portion of the light is in the first diffraction order and some in the second. The light in the first order is reflected back towards the ring gratings 66 and 67 by the thin film coating 75 on the forward (code facing) surface of the collector plate 65. When this light interacts with the grating again, the majority of light is in the second diffraction order of the incident light, which sends the light in the substrate to concentrators 91 and 93 situated over the detectors. There are essentially no other interactions with the gratings. The concentrators are annular, and specifically circularly symmetric parabolic surfaces in the center of each grating 66 and 67 which focuses the light down to the detectors 68 and 73 located on the circuit board 62 below the gratings.

Light propagating through the plate 65 reaches the concentrators 91 and 93 and is transduced by the photodetectors 68 and 73, into electrical signals representing the code. These signals may be processed and/or detected by integrated circuits (ICs) 72 and 77 which are mounted on the upper board 62.

In order to reciprocally oscillate the scanning assembly of the scan engine 28 about the axis defined by the flexures 46 and 48 there are provided an electromagnetic driver having coils 74 and 76 depending from the upper board 62. Pole pieces 78 and 80 concentrate the electromagnetic field and provide attraction or repulsion to permanent magnets 82 and 84 which are in electro-magnetically coupled relationship with the coils. When one coil attracts the other repels so as to drive the support including the laser diode 44 and the receptor 42 with an oscillatory motion as indicated by the arrows 88 (See FIGS. 6, and 7). This motion causes the scan beam 40 to scan across the code. Connections are provided in the board 62 from the circuits 72 and 77. These circuits have components which switch current to the coils 74 and 76 to cause the oscillation of the laser diode 44 and the receptor 42 about the pivotal axis defined by the flexures 46 and 48. The receptor 42 oscillates conjointly (together) with the laser diode since they are tied together by a common support structure. Thus, as the beam scans the code, illumination is received which is translated into signals containing the data represented by the code.

Figure 7:
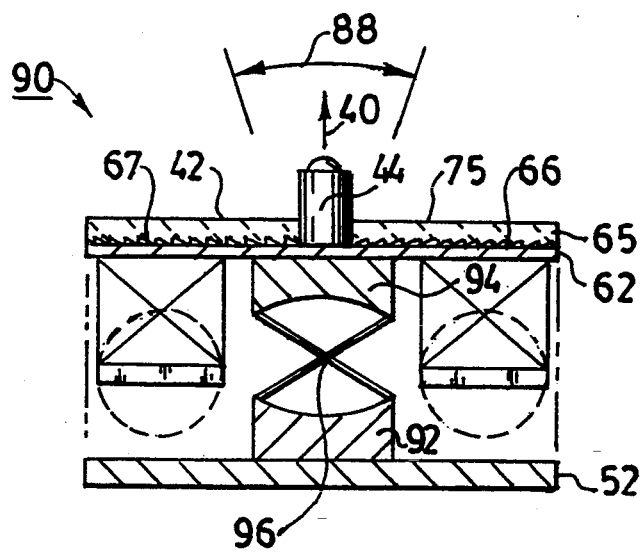
FIG. 7 is a view similar to FIG. 6 with a flexural support of design different than that used in the scan engine module of FIGS. 1 through 6.

Referring to FIG. 7 there is shown a scan engine module 90 which is similar in many respects to the scan engine module 28, and like parts are identified by like reference numerals. Only one circuit board 62 is used. The laser diode is mounted on the board through an opening in the substrate 65 and its grating. The flexures are provided by crossed springs of a design similar to those discussed in the above-referenced U.S. Pat. NO. 5,115,120. These springs are offset from each other in blocks 92 and 94 which are distributed along the pivotal axis of the engine indicated at 96 so as to provide as many conductive paths through the flexures as are needed to connect the integrated circuits and the driving means (the coils) of the scan engine to terminals of the scan engine, and also to provide operating power to laser diode 44 from such terminals. Blocks 92 and 94 may be molded plates of conductive plastic material to provide conductive paths from the flexures to the circuit board 62.

Referring again to FIGS. 8 and 9, there is shown diagrammatically the collector 42. The miniature size of a typical collector may be 2.0 mm in thickness between the forward face having the coating 75 and the rear face 71 on the board 62. The thickness of the board 62 may be 0.51 mm. The width of the collector between its longitudinal edges 101 and 103 may be 18 mm and its length may be 36 mm. These sizes are typical and have been found to provide collection of bar code return light about the same as the PSC Inc. model 5300 Bar Code Reader which is shown in the Eastman et al U.S. Pat. No. 5,200,597 (referenced above).

The grating may be blazed grooves forming the rings; the grooves being of sawtooth shape. Typically they may have a constant pitch of 0.9 micrometers ($\mu$m) and inclined at about 25°. FIG. 9 shows how typical incident rays are collected and concentrated and directed to the photodetectors 68 and 73 at the center of each grating 66 and 67. The two gratings 66 and 67 are disposed symmetrically about a line 49 which bisects the rectangular plate 65 such that the grating rings intersect, forming cusps at 47.

The grating collector axicons locally diffract the light returned by the bar code according to the well known diffraction equation (here written in direction cosine space):

$$\alpha_m^1 = \alpha + m \frac{\lambda}{p} \cos\phi$$

$$\beta_m^1 = \beta + m \frac{\lambda}{p} \sin\phi$$

In these equations, m is the diffraction order. $\lambda$ is incident wave length. p is the diffraction grating pitch. $\phi$ is the angle of the local grating groove tangent. $\alpha$ and $\beta$ are the incident direction cosines. $\alpha^1_m$ and $\beta^1_m$ are the diffracted direction cosines of order m. The grating pitch p is chosen so that light diffracted into the first order is incident at a high enough angle to be reflected by coating 75. Note that the embodiment shown in FIG. 9 has a constant pitch, and thus, all 2nd order rays are parallel. The grating pitch may be varied in order to vary collection efficiency with distance from the scanner to the bar-code (range).

From the foregoing description it will be apparent that there has been provided improved scan engines which may be fabricated in miniature form, and improved light receptors especially useful therein. The invention also provides a scanning accessory useful in providing integrated portable terminal with separable data collection and scanning units which may be used individually or assembled to form the integrated terminal. Variations and modifications in the herein described scan engines, receptors, collectors and integrated terminal, within the scope of the invention, will undoubtedly suggest themselves to those skilled in the art. Accordingly, the foregoing description should be taken as illustrative and not in a limiting sense.

We claim:

1. A scanning accessory for a portable terminal for collecting and entering data which comprises a first housing defining a receptacle and having a window and a surface defining a manually graspable handle, a miniature scan engine module having means for projecting a light beam outwardly from said module, said scan engine being disposed in said receptacle with the beam projecting through said window towards said symbol, and an electro-optical receptor in said hollow body for collecting return light from said symbol in response to illumination by said beam and providing electrical signals representing said symbol, said receptor having a photodetector, a diffraction grating having a plurality of concentric rings embedded within said receptor means for directing light diffracted by said grating to said photodetector, and means in said housing for operating said scan engine.

2. The scanning accessory according to claim 1 wherein said electro-optical receptor comprises an optical collector comprising a body having a first surface exposed to light from the symbol and a second surface spaced from said first surface, a light coupling structure along said first surface for entering the light from the symbol into said body via said first surface for propagation in said body to said second surface, said grating being disposed along said second surface, said photodetector comprising an opto-electric transducer in light receiving relationship with said first surface responsive to said return light reflected at said first surface toward said photodetector.

3. The scanning accessory according to claim 2 wherein means, including said light coupling structure, are provided for folding said light at least once in said body so that it is confined in said body and propagates to said photodetector.

4. The scanning accessory according to claim 3 wherein said means for folding said light includes said grating and a reflective coating along said first surface, said grating and coating being operative to fold said light a plurality of times in said body.

5. The scanning accessory according to claim 2 wherein body has a thickness between said first and second surfaces of about 2 mm or less.

6. The scanning accessory according to claim 2 wherein said body light coupling structure is a layer of material which is generally reflective at incidence angles greater than about 10° measured inside the collector body and generally transmissive at incidence angles of generally less than about 10° measured in air, said layer being disposed along said first surface, said rings being around a center, said photodetector being disposed along a line perpendicular to said second surface such that said center extends generally through said photodetector, and said first surface and layer defining an annular reflective light concentrator around said center.

7. The scanning accessory according to claim 6 wherein said grating is a diffractive axicon, said grating having lines which have a periodicity which is constant or increases or decreases in a direction radially outward of said rings to focus said light at said concentrator.

8. The scanning accessory according to claim 7 wherein said axicon has a plurality of said grating rings along said second face spaced at constant periodicity.

9. The scanning accessory according to claim 6 wherein said layer is a thin film coating on said first surface.

10. The scanning accessory according to claim 6 wherein said concentrator has an annular surface which is a parabolic cusp having a center along said center.

11. The scanning accessory according to claim 1 wherein said body has a plurality of sets of said grating rings along said second surface, and a plurality of photodetectors each responsive to light diffracted by a different one of said sets.

12. The scanning accessory according to claim 11 wherein said body is a plate having said sets symmetrically disposed about a midline of said plate, a board on which said plate is mounted with said second surface adjacent to a surface of said board.

13. The scanning accessory according to claim 1 wherein said electro-optical receptor comprises an optical collector comprising a body having a first surface exposed to light from said symbol and a second surface spaced from said first surface, said first surface being reflective and transmissive of light incident thereon at greater and less than a certain incidence angle, said light from said symbol being incident on said first surface at less than said certain angle and said light being diffracted by said grating and being incident on said first surface at greater than said certain angle, whereby light from said symbol enters into said body via said first surface for propagation in said body to said second surface, said grating being disposed paralleling said second surface, said photodetector comprising an optoelectric transducer in light receiving relationship with said first surface responsive to said return light diffracted by said grating and reflected at said first surface towards the photodetector.

14. The scanning accessory according to claim 13 wherein means including said first surface and said grating are provided for folding said light at least once in said body so that said light is confined in said body and propagates to said photodetector.

15. The scanning accessory according to claim 14 wherein said certain angle at which said first surface is generally transmissive is generally less than about 10° measured in air and said certain angle at which said first surface is generally reflective is greater than about 10° measured inside the collector body.

16. The scanning accessory according to claim 13 wherein said rings are around a center, said photodetector being deposed along a line perpendicular to said second surface said line extending generally through said center, and said first surface defining an annular reflective light concentrator around said center facing said photodetector.

17. The scanning accessory according to claim 16 wherein said grating is a diffractive axicon, said grating having lines which have a periodicity which is constant or increases or decreases in a direction radially outward of said rings to focus said light at said concentrator.

18. The scanning accessory according to claim 1 wherein said grating is a diffractive axicon, said grating lines having a periodicity which is constant or increases or decreases in a direction outward of said rings.

19. The scanning accessory according to claim 13 wherein said body has a plurality of sets of said embedded grating rings paralleling said second surface, and a plurality of photodetectors each responsive to light diffractive by a different one of said sets.

20. The scanning accessory according to claim 19 wherein said body is a plate and said sets are symmetrically disposed about a midline of said plate.

21. A scan engine for providing a light beam for scanning and optically readable symbol and providing signals representing said symbol in response to illumination thereof by said beam characterized in that said engine comprises an electro-optical receptor comprising an optical collector comprising a body having first surface exposed to the light from the symbol and a second surface spaced from said first surface, a plurality of grating rings about a center disposed along said second surface for diffracting light incident thereon toward said first surface, a light coupling structure along said first surface for entering the light from the symbol into said body via said first surface for propagation in said body to said second surface and having light concentrating means, where said light diffracted by said rings toward said first surface is concentrated, and said receptor further comprising a photodetector in light receiving relationship with light from said concentrating means.

22. The scan engine according to claim 21 further comprising a first support, a light source providing said light beam and mounted on said first support, said electro-optical receptor also being mounted on said first support with said first surface facing in the same direction as said beam projects, a second support, flexure means connecting said first support to said second support and a defining pivotal connection therebetween, and drive means on said supports for reciprocating said first support with respect to said second support about said pivotal connection to scan said beam and said receptor.

23. The scan engine according to claim 22 wherein said second support comprises a base, said first support comprises a board, said drive means being an electromagnetic drive having an armature on said board and a stator on said base, said armature and stator being electromagnetically coupled to each other.

24. The scan engine according to claim 22 wherein said source is a semiconductor laser device in a barrel, said barrel being attached to said first support, and an optically transmissive portion in said electro optical receptor which either contains said barrel or through which said beam passes.

25. An electro optical receptor which comprises an optical collector comprising a body having a first surface exposed to incident light and a second surface spaced from said first surface, a light coupling structure defined by material forming said first surface for entering the incident light into said body via said first surface for propagation in said body to said second surface, a diffractive element embedded within said body comprising a plurality of rings around a center, said receptor further comprising an opto-electric transducer along a line transverse to said second surface through said center and in light receiving relationship with light diffracted by said element, said light reaching said transducer after reflection at said first surface and being translated into electrical signals.

26. The receptor according to claim 25 wherein said light coupling structure is provided by said first surface which is transmissive of light incident thereon at less than a certain angle and reflective of light incident thereon at greater than said certain angle for folding said light at least once in said body so that it is confined in said body and propagates to said transducer, and a concentrator defined by said first surface for collecting and directing said light in said body towards said transducer.

27. The receptor according to claim 26 wherein said means for folding said light includes said diffractive element.

28. The receptor according to claim 26 wherein a plurality of said diffractive ring elements are provided in a plate defining said body, and a plurality of said concentrators and of said transducers in reflected light receiving relationship with said concentrators, said concentrators and said transducers being located about the centers of said elements for receiving light reflected by said concentrators.

29. The receptor according to claim 25 wherein said body is a plate having a thickness about 2 mm or less.

30. The receptor according to claim 25 wherein said material is in the form of a coating on said first surface.

31. A scan engine for providing a light beam for scanning an optically readable symbol and providing signals representing said symbol in response to illumination thereof by said beam characterized in that said engine comprises an electro-optical receptor comprising an optical collector comprising a body having a first surface exposed to the light from said symbol and on which said light from said symbol is incident and a second surface spaced from said first surface, a plurality of grating rings about a center, said rings being disposed along said second surface for diffracting light incident thereon towards that first surface, said first surface being reflective and transmissive of light incident thereon at greater and less than a certain angle, said light from said symbol being incident on said surface at less than said certain angle and said light diffracted by said grating being incident on said first surface at more than said certain angle whereby light from said symbol is entered into said body via said first surface for propagation in said body to said second surface, light concentrating means along said first surface where light diffracted by said rings towards said first surface is concentrated, said receptor further comprising a photodetector in light receiving relationship with light from said concentrating means.

32. The scan engine according to claim 31 wherein a plurality of sets of said grating rings is embedded in said body each set having a center, said first surface having a plurality of said concentrating means each concentric with said center and a plurality of photodetectors and each in light receiving relationship with light from different ones of said concentrating means.

33. The scan engine according to claim 32 wherein said plurality of sets of grating rings comprises a pair of grating rings disposes symmetrically about a bisector through said body which bisect said first surface.

34. The scan engine according to claim 33 wherein said body is a plate and said bisector is a midline of said plate.

* * * * *